Figure 1:
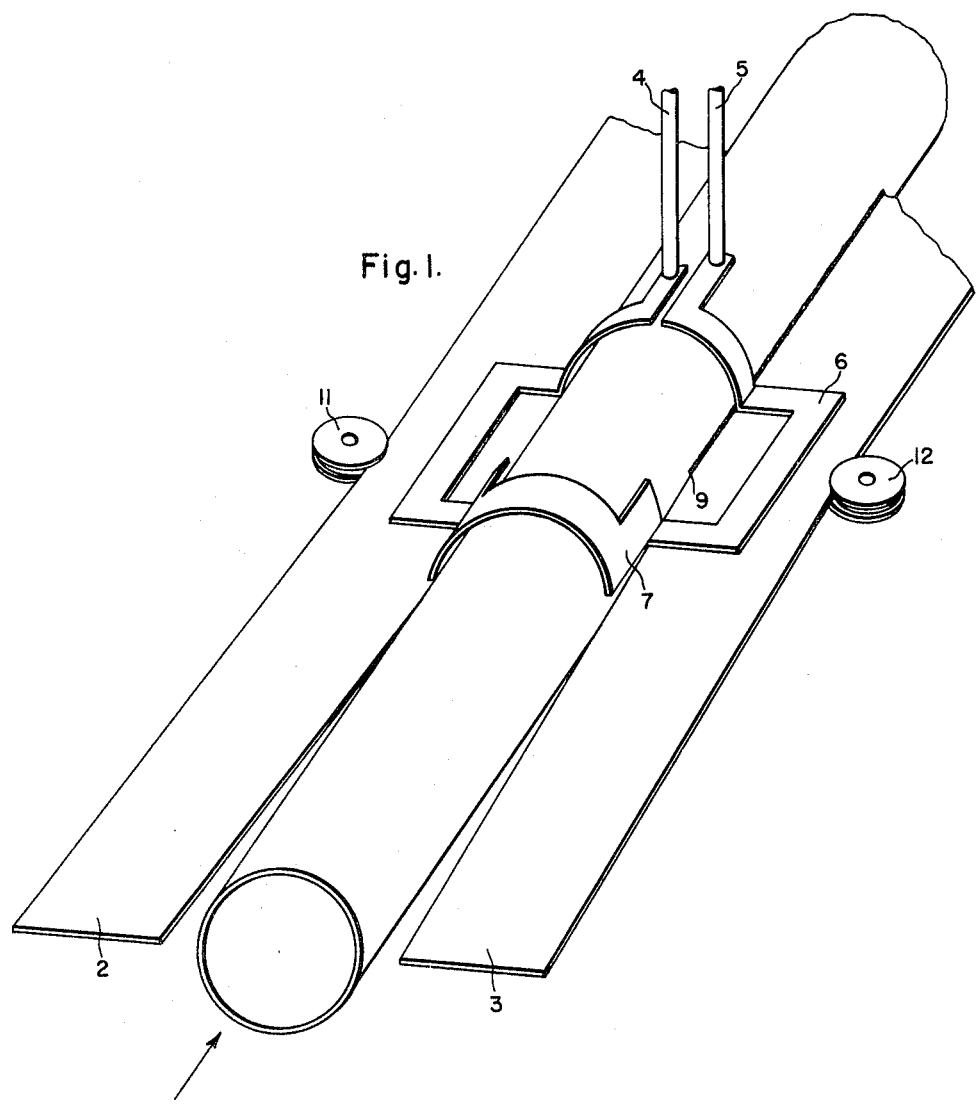

United States Patent Office 3,230,337
Patented Jan. 18, 1966

3,230,337
CONTINUOUS INDUCTION WELDING PROCESS
AND APPARATUS
Fernand Viart, Marcinelle, Belgium, assignor to Ateliers de Constructions Electriques, Brussels, Belgium, a corporation of Belgium
Filed June 25, 1963, Ser. No. 290,377
Claims priority, application France, July 3, 1962, 902,811, Patent 1,338,384
9 Claims. (Cl. 219—9.5)

The present invention relates to an induction heating process and apparatus suitable for welding together elongated members as in continuously manufacturing tubes with fins, or similar products, in the process of which the heat required for welding is obtained by moving the components to be joined into the immediate vicinity of an inductor coil, the said coil inducing a current in the parts to be welded together, the current path following the surfaces which are about to make contact, the said current being concentrated in the exterior surfaces where the welding takes place with the aid of pressure applied by forging rollers.

An object of the invention is to provide an improved process and apparatus of the above type.

The invention is characterized by the fact that the tube and the fins are passed into the immediate proximity of an inductor coil consisting of at least one turn, and this turn is made in such a shape that a part of the said turn faces two neighboring fins along the section where they are welded to the tube, while the other part, which is in advance of the welded region, is so located as to come opposite to that region of the tube lying between neighboring fins which are still to be welded to it. The new process is especially useful for the production of tubes having an even number of lateral fins. In this case, the tube and the fins may be conveniently passed across an inductor consisting of several turns as specified above, connected in such a manner that the currents in the turns facing the same fin circulate in the same direction. In this case, the turns are arranged on both sides of each fin in such a manner that, during the passage the total coupling between the pieces to be welded and the turns of the inductor always remains constant, even if the pieces to be welded deviate a little from their average position imposed by the guiding rolls of the machine. This is because any weakening in the coupling on one side of a fin due to an increase in its distance from a turn is automatically compensated for by a stronger coupling on the other side due to the fin approaching another turn.

The part of the turn located in advance of the welded regions and which faces the region of the tube to which the fins are yet to be welded is shaped so as to be a function of the amount of preheating required, either by the fins or by the tube. Thus, if in order to equalize temperatures at the instant of welding it becomes necessary to preheat the tube a little and to provide a large amount of heat to the fins, the portion of the coil facing the tube located between the two fins to be welded is turned back over the part of the turn which faces the place where the two fins are welded to the tube. On the other hand, if, as is generally the case, the tube requires a greater measure of preheating and the fins require a smaller amount in order to attain equal temperatures at the moment of welding, the part of the turn opposite the region of the tube located between the two fins to be welded should be elongated and form an excrescence (extended portion) in the part of the turn facing the two fins.

Other objects and features of the invention will become apparent from the following description.

Figure 2:
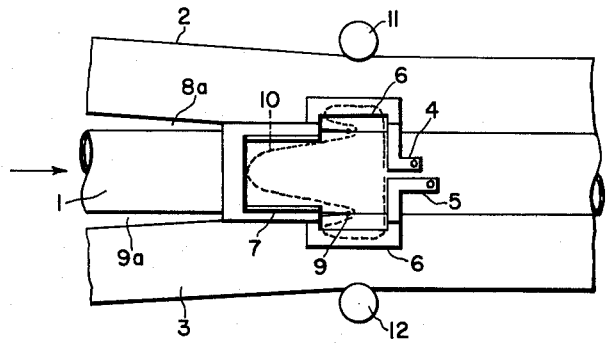
Figure 3:
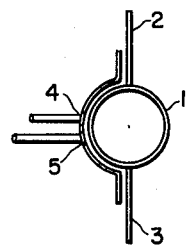
Figure 4:
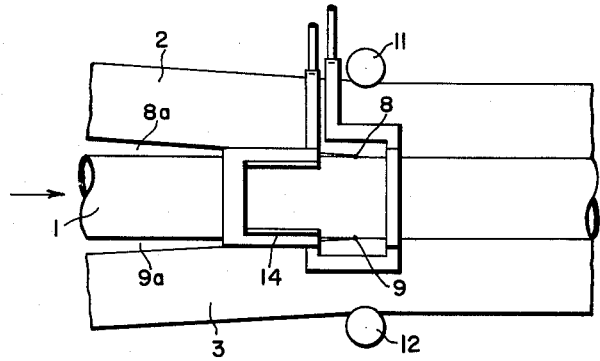
Figure 5:
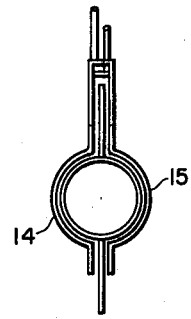
Figure 7:
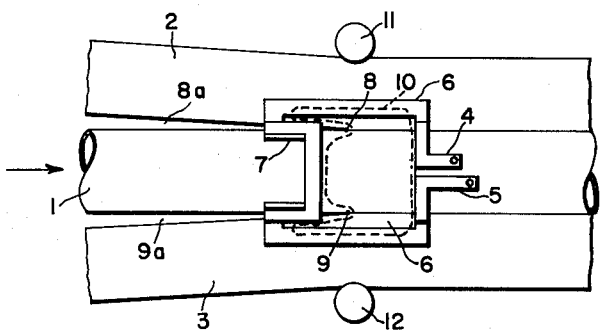

The invention is described below. A few examples in which the invention may be carried out are illustrated by the appended drawings. FIGURE 1 gives a perspective view of the principal parts of a machine whereby the invention may be realized, and FIGURE 2 is a schematic view in plan of FIGURE 1, while FIGURE 3 is a schematic view of an elevation of FIGURE 1. FIGURES 4 and 5 show schematic views in plan and in elevation of a machine similar to that shown in elevation of an arrangement of turns for welding the tubes to four fins. FIGURE 7 is a variant of FIGURE 2.

In FIGURES 1, 2 and 3, a tube 1 and two fins 2 and 3 are steered by guiding rollers (not shown) so that they pass in the direction of the arrow in separation by two V-gaps 8a and 9a to face a coil connected by means of connectors 4 (shorter) and 5 (longer) to a generator (not shown) having a suitable frequency. In the drawings, one of the connectors is shown longer and the other shorter to make it possible to indicate the direction of the current in each coil. The coil consists of a part 6 facing two neighboring fins welded to the tube and by a part 7 which is ahead of points 8 and 9 where welding takes place; this coil (turn) induces a heating current on the surfaces of the fins and the tube, the path of the said current approximately following the broken line 10. Welding at points 8 and 9 is assured by means of forging rollers 11 and 12.

When it is required to weld two fins along the entire length of a tube, it is advantageous to make an inductor which consists of two turns 14 and 15 which are connected in parallel, and arranged on both sides of the plane of the fins, as shown schematically in FIGURES 4 and 5.

Figure 6:
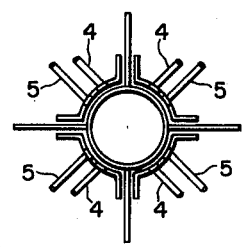

In FIGURE 6 is represented the case of a tube on which four fins are mounted. In this case, four turns may be arranged around this tube and connected in parallel as indicated symbolically by the lengths of the connectors 4 and 5 associated with each turn. Using an arrangement in accordance with FIGURE 6, the currents in the conductors facing a given fin circulate in the same direction.

FIGURE 7 shows a variant of the inductor shown in FIGURE 2 in which the part of the turn 7 has a different shape which permits a different distribution of the preheating of the tube and the fins to be realized, the said preheating being determined by the path travelled by the induced currents as represented by the broken curve 10.

The invention is applicable not only to fins which are parallel to the axis of the tube but also to helicoidal fins and even to the welding of side plates (cheek plate, support) on the tubes. In place of round tubes other profiles may be used.

I claim as my invention:

1. A process for the continuous production of tubes with fins or of similar products in which heating is applied for the purpose of welding, the said process consisting of passing the parts to be welded into the immediate proximity of an inductor which induces a current in the parts to be welded, the said current following the surfaces which are about to enter into contact by reason of their proximity and which is concentrated at the exterior where welding occurs under the pressure of forging rollers, the process being characterized by the passage of the tube portions and the fin portions in the immediate proximity of an inductor coil consisting of at least one turn, the said turn being made in such a way that one part lies opposite two neighboring fins being welded to tube portions and the other part is arranged so as to be ahead of the regions where welding has taken place opposite the region of a tube portion located between these adjacent fins.

2. A method of continuous manufacture in accordance with claim 1 and which is so characterized that in order to manufacture tubes with an even number of lateral fins, the tube and the fin portions are passed across an inductor consisting of several turns and the said turns being connected in such a manner that the currents in the conductors of the turns facing opposite sides of a given fin portion circulate in the same direction.

3. A method of continuous manufacture in accordance with claim 1 and which is so characterized that the part of the turn which is arranged ahead of the welded regions facing the region of the tube portion located between two adjacent fin portions is determined as a function of the preheating desired either for the fins or the tube.

4. Apparatus in which two elongated portions are continuously welded, in spaced-apart fashion, to a third elongated portion by induction heating, while being advanced and progressively brought into contact with said third portion at respective weld points to form a welded composite of all such portions, said apparatus comprising an inductor coil consisting of at least one turn constructed and arranged for immediate proximity with said portions such that a part of the coil lies adjacent to said two elongated portions and another part of the coil extends ahead of said weld points and adjacent to a region of said third elongated portion located between the aforesaid two elongated portions.

5. Apparatus as set forth in claim 4, wherein said inductor coil consists of several turns constructed and arranged such that a corresponding part of each turn will lie adjacent to respective opposite sides of each of said two elongated portions and said turns being connected in such a manner that the currents in their parts facing opposite sides of a given one of said two elongated portions flow in the same direction.

6. Apparatus for continuously induction welding an even number of elongated portions, greater than two, to another elongated portion, in spaced-apart fashion, while being advanced and progressively brought into contact with said other elongated portion at respective weld points to form a welded composite of all such portions, said apparatus comprising an equal number of single-turn inductor coils each having corresponding parts extending adjacent to one face of two adjacent ones of said elongated portions and being connected in such a manner that the currents in coil parts at opposite sides of any given one of said elongated portions flow in the same direction.

7. Continuous induction-welding apparatus in which one elongated portion of a subsequent elongated-welded composite is continuously welded to a second elongated portion of such composite as the portions are advanced and progressively brought into contact at a weld point, said apparatus comprising stationary inductor coil means at such weld point for heating the surfaces of such portions to be joined together, said inductor coil means having respective turns constructed and arranged for disposition adjacent to surfaces of the two elongated portions at opposite sides of the one portion and being connected to an alternating current source in such a manner that the currents in the turns facing opposite sides of said one portion circulate in the same direction, whereby the total inductive coupling between said portions being welded and the turns of said stationary inductor coil means remains constant irrespective of deviation in the average position of such portions during their advancement through such coil means.

8. Apparatus in which continuous subsequently-joined portions of a cylinder construction are continuously advanced and progressively brought together in V-gap fashion at two weld points spaced apart transversely to the direction of advancement, said apparatus comprising inductor coil means disposed in the path of advancement of said portions for proximity with a common side of all such portions and so constructed and arranged as to cause heating current to flow in a circuit therein which includes both weld points and the edges of both V-gaps.

9. Apparatus as claimed in claim 8, further including second inductor coil means disposed in the path of advancement of said portions for proximity with an opposite common side of all such portions and so constructed, arranged, and energized relative to the first named coil means, that the currents in two coil means at opposite sides of such portions circulate in the same direction.

References Cited by the Examiner

UNITED STATES PATENTS 2,632,079   3/1953   Body _____ 219—8.5

FOREIGN PATENTS 74,789   10/1952   Denmark.

RICHARD M. WOOD, *Primary Examiner.*